United States Patent [19]

Worden et al.

[11] 3,915,009
[45] Oct. 28, 1975

[54] PRECISION PRESSURE GAUGE

[75] Inventors: Raymond D. Worden; Lloyd H. Linton; Kurt G. Solis, all of Houston, Tex.

[73] Assignee: Ruska Instrument Corporation, Houston, Tex.

[22] Filed: May 3, 1973

[21] Appl. No.: 356,937

[52] U.S. Cl. ................................ 73/398 R; 73/418
[51] Int. Cl.² ........................................ G01L 9/14
[58] Field of Search .......... 73/398 R, 418, 411–417

[56] References Cited
UNITED STATES PATENTS

| | | | |
|---|---|---|---|
| 3,301,062 | 1/1967 | Reesby et al. | 73/418 |
| 3,538,772 | 11/1970 | Filloux | 73/398 R |
| 3,707,868 | 1/1973 | Fruit | 73/418 |

Primary Examiner—Donald O. Woodiel
Attorney, Agent, or Firm—M. H. Gay; Julian Clark Martin

[57] ABSTRACT

A force-balance, precision pressure gauge employing a fused quartz, helical, bourdon tube to transduce pressure into rotary motion, a fixed optical system to detect such rotary motion, and a force-balance system connected directly to the bourdon tube for rotation therewith to substantially limit such rotary motion.

9 Claims, 10 Drawing Figures

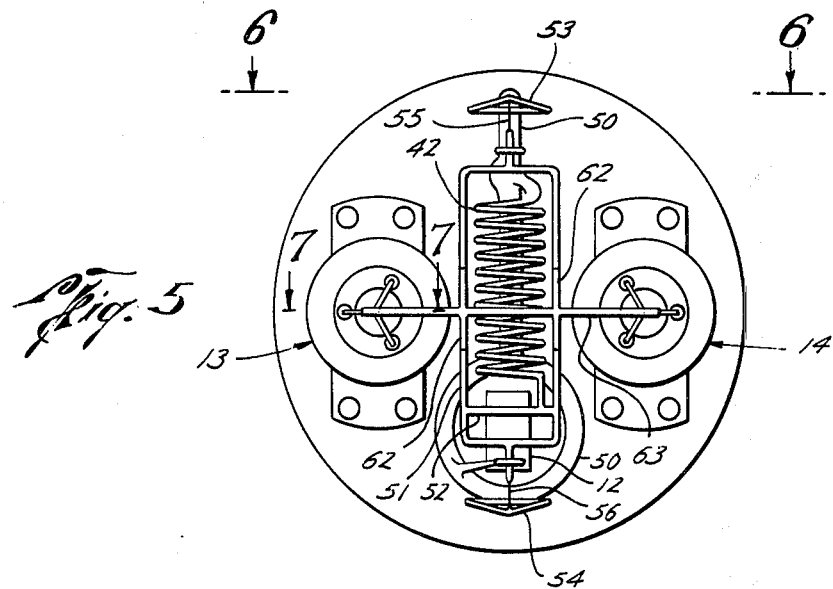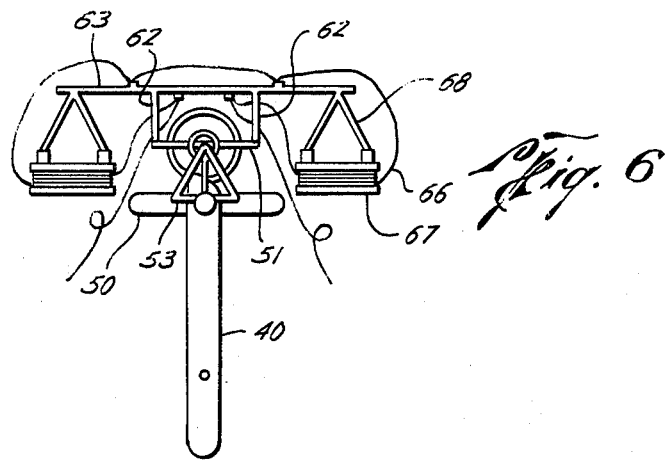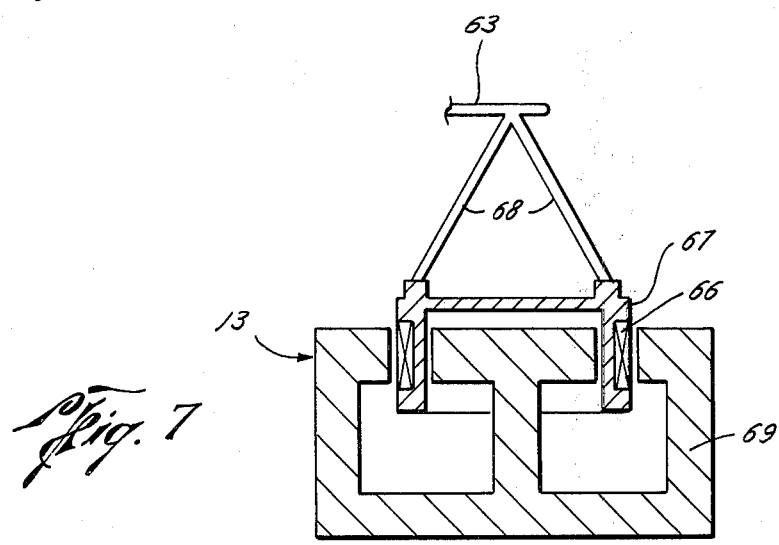

PRECISION PRESSURE GAUGE

BACKGROUND OF THE INVENTION

This invention relates to a force-balance, precision pressure gauge for use in the very accurate measurement of pressure.

Very accurate measurement of pressure has been accomplished through a variety of precision instruments. For example, a pressure gauge manufactured by CEC Universal Electromanometer transduces the pressure to be measured into linear movement through an expansible bellows which deforms linearly responsive to the pressure differential across its walls. The end of the bellows which moves linearly is connected through a level and linkage mechanism to an arm. One end of the arm is mounted for linear movement within a linear differential transformer. The other end of the arm carries a force coil (a coiled electrical conductor) mounted for linear movement in a magnetic field. The instrument employs a force-balance system in that movement of the arm within the differential transformer generates an error signal. Responsive to this error signal, a servo amplifier supplies a proportional current to the force coil resulting in an electromagnetic counter-force to the bellows equal to the force arising from the applied pressure. The current which is applied to the force coil is transduced into a digital output signal.

A digital pressure meter manufactured by Non-Linear Systems, Inc. utilizes a bellows to rotate a beam. A position indicating means coupled to the beam detects the rotation of the beam and provides an indication to a servo amplifier. A controlled current is generated responsive to the output of the servo amplifier. This current is transmitted through drive coils which provide a force to bring the beam back to its null position.

Other similar pressure gauges utilizing force-balance systems incorporate a C-shaped bourdon tube, instead of a bellows, which deforms responsive to a pressure differential across its walls. The end of the deforming bourdon tube converts changes of pressure into linear motion.

A pressure gauge such as is described in U.S. Pat. No. 3,286,529 utilizes a fused quartz, helical bourdon tube to convert changes in pressure into rotary motion. One end of the bourdon tube is fixed. A mirror is mounted along the axis of the bourdon tube for rotation along with the other end of the bourdon tube in response to variations in the pressure differential across the walls of the tube. A light source directs a beam of light onto the mirror. A light detector apparatus mounted with the light source detects the beam after it is reflected by the mirror. A rotatable support is provided for the light source and the light detector apparatus so they may rotate together about the axis of the bourdon tube. A gear train and mechanical counter determines the magnitude of rotation of the rotatable support required to align the deflected beam of light with a selected point on a light detector apparatus. This magnitude of rotary motion is indicative of the pressure to be measured.

A fused quartz precision pressure gauge manufactured by Ruska Instrument Corporation is similar to the instrument disclosed in U.S. Pat. No. 3,286,529 except that the position of the light source is fixed. A rotatable support rotates the light detector apparatus about the axis of the bourdon tube. Again a gear train and mechanical counter is provided to determine the magnitude of rotation required for the reflected light beam to align with a selected portion of the light detector apparatus.

The preferred precision pressure gauge according to this invention utilizes a fused quartz bourdon tube as the apparatus for transducing the pressure to be measured into a selected movement. Fused quartz is more ideal as a pressure transducer than any metal. Fused quartz is one of the most perfectly elastic materials known. Thus, the fused quartz pressure transducer has fewer of the hysterisis, creep, or relaxation effects commonly associated with metal pressure transducers. Use of fused quartz as a pressure transducer in accordance with the present invention makes possible highly accurate pressure measurements. The fused quartz preferably is formed into a helical bourdon tube to transduce the pressure being measured into rotary motion, rather than a C-shaped tube to transduce the pressure being measured into linear motion, in order to accommodate the improved force-balancing system according to this invention. The rotary motion of the fused quartz, helical bourdon tube is sensed optically so that no frictional or reactive forces are imposed on the bourdon tube. Both the electromagnetic radiation source and the electromagnetic radiation detection means fo the optic system are fixed. In a precision pressure gauge according to this invention, any pressure difference experienced by the bourdon tube initiates an electrical signal which is transmitted through torsion means, preferably in the form of electromagnet assemblies, mounted directly to the bourdon tube for rotary movement therewith, which in turn generates a precisely controlled force to ordinarily refrain the bourdon tube from rotating appreciably and, if for some reason the bourdon tube should experience unusual rotation, to substantially balance the rotary forces of the bourdon tube and bring it back substantially to its proper null position for the pressure differential being experienced.

It is an object of this invention to provide an improved precision pressure gauge which transduces pressure into rotary motion rather than linear motion.

It is an object of this invention to provide an improved precision pressure gauge which transduces pressure into rotary motion through the use of a fused quartz, helical bourdon tube, thereby obviating the hysteresis effects attendant to the use of metallic transducers.

It is a further object of this invention to provide an improved precision pressure gauge in which pressure is transduced into rotary motion by a fused quartz, helical bourdon tube and such rotary motion is sensed through the use of electromagnetic radiation direction onto a reflection means mounted for rotation with the bourdon tube.

It is a further object of this invention to provide an improved precision pressure gauge utilizing an electromagnetic radiation source and an electromagnetic radiation detection means in connection with a mirror mounted for rotation with a fused quartz, helical bourdon tube in which both the electromagnetic radiation source and detection means are fixed, thereby obviating the mechanical forces and losses attendant to a rotatable support.

It is a further object of this invention to provide an improved precision pressure gauge in which pressure is transduced into rotary motion by a fused quartz, helical bourdon tube and the magnitude of such pressure is determined by a force-balance system directly connected to the bourdon tube, thereby obviating the metallic linkages attendant to a linearly expansible transducer.

It is an additional object of this invention to provide an improved precision pressure gauge which essentially has no moving parts.

It is an object of this invention to provide an improved precision pressure gauge which combines higher linearity, sensivity, resolution, and accuracy, with simplicity, speed, and reliability, and provides the most maintenance-free, precise pressure gauge yet conceived.

The invention itself, both as to organization and method of operation, as well as additional objects and advantages thereof, will become readily apparent from the following description when read in connection with the accompanying drawings, in which like numerals represent like parts:

BRIEF DESCRIPTION OF THE DRAWINGS

FIG. 5 is a view of the fused quartz, helical bourdon tube and the two torsion means of the force-balance system, taken at line 5—5 in FIG. 4, FIG. 6 is a view of the fused quartz, helical bourdon tube and the two torsion means of the force-balance system, taken at line 6—6 in FIG. 5;

FIG. 7 is a section view of one of the torsion means taken at line 7—7 in FIG. 6.

DESCRIPTION OF THE PREFERRED EMBODIMENTS

Figure 1:
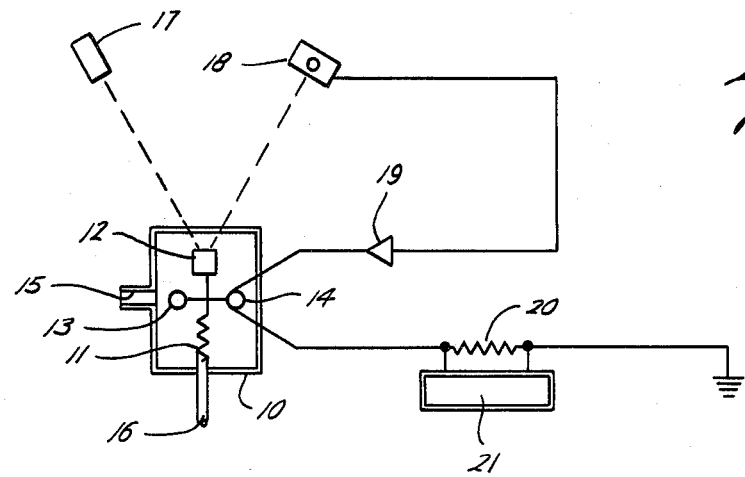
FIG. 1 illustrates diagramatically the elements comprising a preferred embodiment of the present invention.

An embodiment of a precision pressure gauge according to this invention is illustrated diagramatically in FIG. 1. Encapsulated within pressure capsule 10 is a helical shaped, thin-walled, fused quartz, bourdon tube 11. The bourdon tube 11 is anchored at one end to the pressure capsule. The bourdon tube is hollow and deforms responsive to pressure differentials across its walls. The deformation of the bourdon tube 11 is primarily rotary, like a spring, but also includes some linear deformation; fused quartz hinges under tension prevent substantially all of the linear deformation. Secured to the free end of the bourdon tube 11 is a reflective means or mirror 12, which rotates responsive to the deformation of the bourdon tube. Also secured to the bourdon tube for movement with its free end are first and second torsion means 13 and 14, preferably force-balancing electromagnet assemblies. If the free end of the bourdon tube rotates, the torsion means 13 and 14 or force-balancing electromagnet assemblies also rotate.

A port 15 is provided in the pressure capsule 10 for the introduction of pressure. The bourdon tube 11 is hollow and a port 16 is provided to the inside of the bourdon tube for the introduction of pressure. The pressure gauge according to this invention may be operated in either of two primary modes: The pressure supplied to the inside of the bourdon tube exceeds the pressure supplied to the outside of the bourdon tube and the bourdon tube expands through rotation responsive to the pressure differential across its walls; or the pressure supplied to the outside of the bourdon tube exceeds the pressure supplied to the inside of the bourdon tube and the bourdon tube compresses through rotation responsive to the pressure differential across its walls.

An electromagnetic radiation source 17 is fixed with relation to the pressure capsule 10. An electromagnetic radiation detection means 18 is also fixed with relation to the pressure capsule 10. The electromagnetic radiation detection means 18 generates an electrical signal proportional to the position of the electromagnetic radiation beam generated by electromagnetic radiation source 17 and reflected from mirror 12. The electrical signal generated by the electromagnetic radiation detection means 18 is coupled to the input of an amplifier 19. The amplified electrical signal is driven through the first and second force-balancing electromagnets 13 and 14 (shown diagrammatically). The electrical signal supplied to the first and second force-balancing electromagnet assemblies is precisely controlled by the force-balancing system to be proportional to the pressure differential across the walls of the bourdon tube and of a magnitude sufficient to generate magnetic forces great enough to ordinarily refrain the bourdon tube from rotating appreciably and, if or some reason the bourdon tube should experience unusual rotation, to substantially balance the forces of the bourdon tube and bring it back to its proper null position for the pressure differential being experienced. The electrical signal supplied to the first and second force-balancing electromagnet assemblies is then coupled to a precision resistor 20. The voltage drop across precision resistor 20 is coupled to the input of a digital readout apparatus 21 which displays the pressure differential being measured.

When the embodiment of the precision pressure gauge according to this invention illustrated in FIG. 1 is utilized to test another pressure instrument, the pressure being tested is simultaneously supplied to the precision pressure gauge (FIG. 1 illustrates the test pressure being applied through port 16 to the inside of the bourdon tube and the reference pressure being applied through port 15 to the outside of the bourdon tube; they could be reversed) and to the input of the instrument whose accuracy is being tested. The magnitude of the pressure is displayed on digital readout apparatus 21. If the readout of the instrument being tested does not correspond thereto, it will evidence that the instrument being tested is inaccurate and the magnitude of such inaccuracy.

Figure 2:
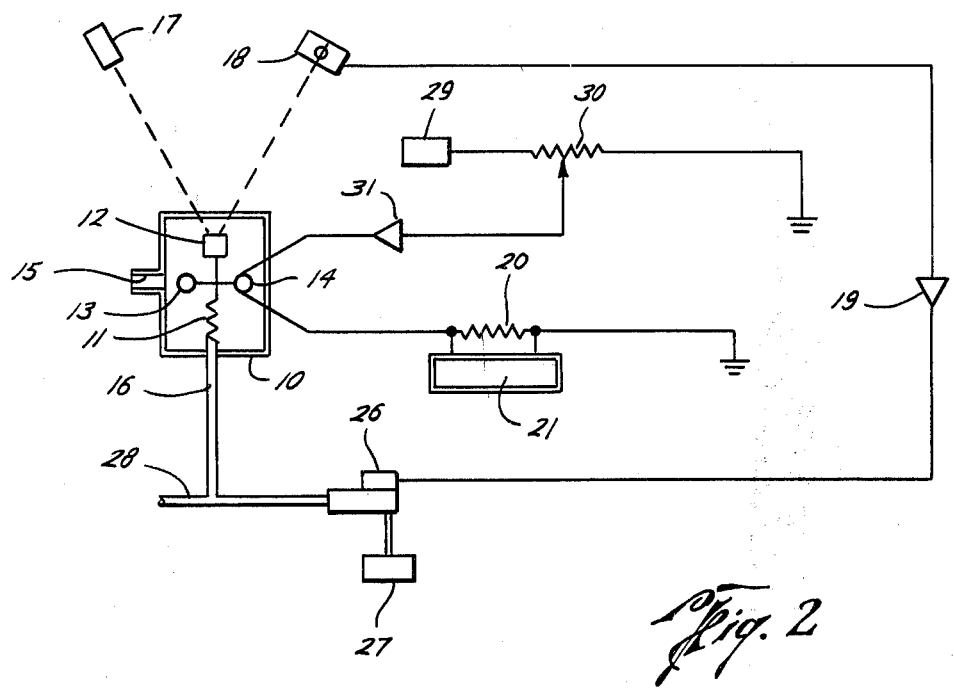
FIG. 2 illustrates diagrammatically the elements comprising another embodiment of the present invention.

An alternate embodiment of the precision pressure gauge according to this invention is illustrated diagrammatically in FIG. 2. The pressure capsule 10, bourdon tube 11, mirror 12, first and second force-balancing electromagnets 13 and 14, port 15, electromagnetic radiation source 17, and electromagnetic radiation detection means 18, are as previously explained in FIG. 1. The output of the electromagnetic radiation detection means 18 is again coupled to amplifier 19. The amplified electrical signal from amplifier 19 is coupled to the input of a servo valve 26 which controls the supplying of a selected pressure from pressure source 27. The selected pressure is supplied to the bourdon tube 11 and also through conduit 28 to the instrument being tested (not shown). A power supply 29 supplied an electrical signal to potentiometer 30. The output of the potentiometer 30 is coupled through an amplifier 31 to the first and second force-balancing electromagnets 13 and 14. The electrical signal supplied through the force-balancing electromagnets is then coupled to precision resistor 20. The voltage drop across precision resistor 20 is supplied to a digital readout apparatus 21.

By adjusting potentiometer 30 and viewing the magnitude of pressure displayed on the digital readout apparatus 21, an electrical signal can be supplied through the first and second force-balancing electromagnets 13 and 14 proportional to the desired pressure differential across the walls of the bourdon tube. As the bourdon tube deforms responsive to the electrical signal being supplied to the first and second force-balancing electromagnets, the electromagnetic radiation beam reflected from mirror 12 to the electromagnetic radiation detection means 18 causes an electrical signal to be generated which is amplified and coupled to the input of the servo valve 26. The servo valve 26 then supplies the requisite pressure to the bourdon tube 11 and through conduit 28 to the instrument to be tested. Thus, rather than supplying an unknown pressure to the precision pressure gauge and the instrument to be tested and determining from the precision pressure gauge the magnitude of such pressure, the embodiment of the pressure gauge according to this invention illustrated in FIG. 2 automatically regulates the magnitude of the pressure which is supplied to the instrument to be tested.

Referring to FIGS. 3, 4, 5 and 6, the preferred construction of the mechanical components of the precision pressure gauge according to this invention shall be described. The pressure capsule functions to provide a means for supporting the bourbon tube within a chamber which can be sealed from the atmosphere, for supporting the optical system which is attendant to the bourdon tube and which determines the magnitude of the rotary movement of the bourdon, tube, and for supporting the stationary components of the torsion means attached to the bourdon tube. The pressure capsule 10 preferably is comprised of a housing 36 which is connected by bolts 37 to a plate 38. Housing 36 includes a cavity which, when housing 36 is bolted to plate 38, forms a pressure chamber 39. A port 15 through the housing 36 provides fluid communication between the pressure chamber 39 and the outside of the pressure capsule 10. A hollow, thin-walled, fused quartz, helical, bourdon tube 11 is mounted within the pressure chamber 39 as will be hereinafter explained. A port 16 through the plate 38 provides fluid communication between the inside of the bourdon tube 11 and the outside of the pressure capsule 10.

The fused quartz bourdon tube 11 is a hollow tube extending from a capillary inlet tube 40 and tapering into an helically shaped spring 42. The capillary inlet tube 40 of the bourdon tube 11 is mounted in a hollow receiving element 43 which in turn is mounted in a cavity 44 in the plate 38. The hollow bourdon tube 11, through the capillary inlet tube 40, is in fluid communication with the port 16. O-rings 45 surround the capillary inlet tube 40 and prevent leakage of the pressure being supplied to the inside of the bourdon tube 11. The manner in which the capillary inlet tube 40, receiving element 43, and O-rings 45 are mounted within cavity 44 is described in United States letters Patent 3,701,634 issued Oct. 31, 1972 entitled "Reaction Vessel Assembly." Such unique mounting allows the bourdon tube to withstand very high pressure differentials.

Fused to the capillary inlet tube 40 of the bourdon tube 11 at the point that it tapers into the helically shaped spring 42 is a quartz support member 50. The quartz support member 50 extends along the length of the helical shaped spring portion 42 of the bourdon tube and functions to support the spring portion 42 of the bourdon tube. At the end of the bourdon tube adjacent to its capillary inlet tube 40 (referred to hereinafter as the upper end of the bourdon tube), the configuration of the support member 50 preferably is that of a rod. At the end of the bourdon tube away from its capillary inlet tube 40 (referred to hereinafter as the lower end of the bourdon tube), the support member 50 preferably changes its configuration from that of a rod to that of an annular ring. By assuming a circular configuration, the support member 50 provides a hole through which the electromagnetic radiation beam may travel uninterrupted to and from the mirror secured to the bourdon tube.

A main beam is associated with the helical shaped spring portion 42 of the bourdon tube for maintaining such spring portion against excessive linear deformation, for providing an axis about which the spring portion 42 can rotate responsive to a pressure differential across its walls, and for preventing the free end of the spring portion 42 of the bourdon tube from swaying and moving about. As illustrated particularly in FIGS. 3 through 6, the main beam 51 preferably comprises four quartz rods fused together to form an open, rectangularly-shaped assembly. A protruding rod of quartz is fused to each end of the open rectangularly-shaped assembly. The main beam 51 is positioned around the helical shaped portion 42 of the bourdon tube so that such helical shaped portion 42 of the bourdon tube is positioned within the open space of the main beam 51, and the free end of the helical shaped portion 42 of the bourdon tube is secured to a quartz rod 52 fused across the main beam 51.

The main beam is mounted in tension to the support member 50 such that it rotates with the helical shaped portion 42 of the bourdon tube about the same axis of rotation as the helical shaped portion 42 of the bourdon tube. Preferably a first tensioner support member 53 extends form the support member 50 at its upper end and a second tensioner support member 54 extends from the support member 50 at its lower end. Each of the first and second tensioner support members 53 and 54 is triangularly shaped for the purpose of providing needed strength. The main beam 51 is pivotally secured between the first and second tensioner support members 53 and 54 by first and second hinges 55 and 56, respectively, secured between one of the protruding quartz rods of the main beam and an apex of the triangularly shaped tensioner support element. Each of the hinges preferably is formed of fused quartz, such as by applying localized heat and drawing a portion of the protruding rod of the main beam 51 out to a filament of very small diameter. The main beam 51 pivots with a minimum of friction about an axis between the selected apices of the first and second tensioner support elements 53 and 54. Such axis corresponds to the axis of rotation of the helical shaped portion 42 of the bourdon tube.

The main beam 51 is held under tension by the hinges and the tensioner support elements to remove most of the linear movement of the helical shaped portion 42 of the bourdon tube. Additional elements are mounted on support member 50 to prevent undesirable lateral movement of the main beam 51. Preferably these elements comprise first and second quartz ring support members 57 and 58 with quartz rings 59 and 60, respectively, fused thereto. First ring support member 57 is fused to the upper end of support member 50 and second ring support member 58 is fused to the circular, lower portion of the support member 50. The protruding rods of the main beam are contained within the quartz rings.

Secured to the cross rod 52 of the main beam 51 adjacent the lower end of the support member 50 is a reflective means 12 or mirror. The reflective means 12 is mounted such that it rotates with the main beam, which in turn rotates with the helical shaped portion 42 of the bourdon tube. The reflective means 12 is mounted adjacent the open, circular, lower end of the support member 50 whereby an electomagnetic radiation beam can be directed through the open, circular lower end of the support member 50 and reflected off of the reflective means 12 back through such open, circular lower end. The reflective means 12 is designed to reflect the particular frequency of electromagnetic radiation beam being utilized.

The precision pressure gauge according to this invention includes a force-balancing system comprising torsion means connected to the helical shaped portion 42 of the bourdon tube for rotation therewith. The torque supplied to the helical shaped portion 42 of the bourdon tube is in a direction and of a magnitude to refrain the bourdon tube from rotating appreciably under ordinary circumstances and, if for some reason the bourdon tube should experience unusual rotation, to return the bourdon tube substantially to its proper null position for the pressure differential being experienced. By utilizing such a force-balancing system, the need for rotation of the electromagnetic radiation source and/or the electromagnetic radiation detection means is obviated.

The torsion means 13 and 14 preferably are connected to the helical shaped portion 42 of the bourdon tube through the main beam 51. Preferably a latticework assembly 62 comprised of interconnected fused quartz rods is connected to the main beam 51 on either side of the helical shaped portion 42 of the bourdon tube. The latticework assembly 62 supports a torsion means support rod 63 which is mounted perpendicular to the axis of rotation of the main beam and which extends outward laterally from the main beam an equal distance on either side thereof. Depending from each end of the torsion means support rod 63 is a torsion means 13 and 14 respectively.

Figure 3:
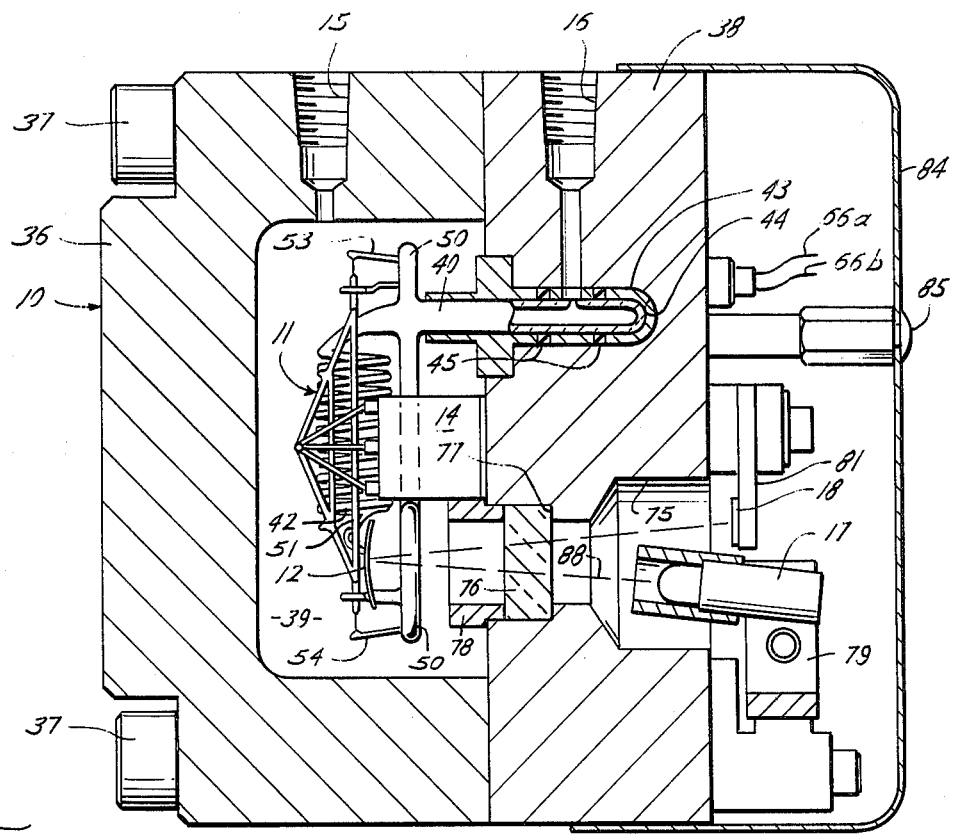
FIG. 3 is a side elevation view of a fused quartz, helical bourdon tube with a mirror attached thereto encapsulated in a pressure capsule and an attendant electromagnetic radiation source and detection means according to this invention, with the pressure capsule being shown in section.
Figure 4:
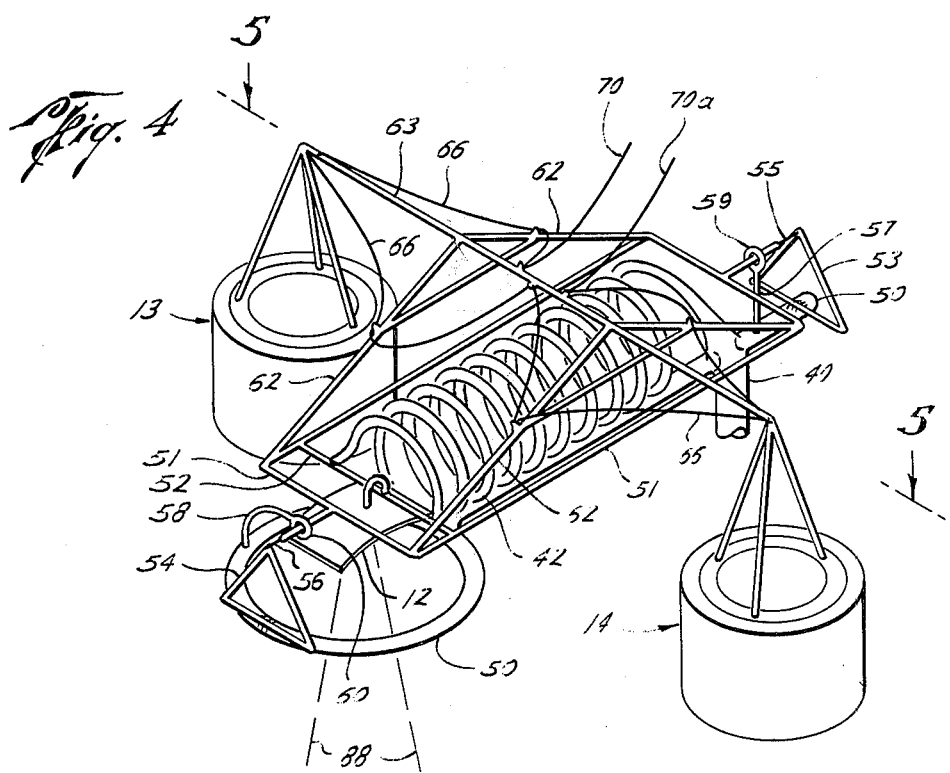
FIG. 4 is an enlarged, isometric, side elevation view of the fused quartz, helical, bourdon tube and the two torsion means of the force-balance system taken from FIG. 3.

Preferably each of the torsion means 13 and 14 is an electromagnet assembly. As illustrated particularly in FIGS. 6 and 7, each electromagnet assembly preferably comprises an electrical conductor 66 coiled around a circular, non-magnetic bobbin 67, preferably constructed of very pure aluminum. Each bobbin 67 is suspended from rod 63 by three equally spaced quartz rods 68 and is mounted for linear movement within a cylindrical permanent magnet 69 mounted to plate 38 of the pressure capsule (the mounting of the permanent magnets is illustrated in FIGS. 3 and 5). The permanent magnets may be any of numerous commercially available types well known to those skilled in the art. The permanent magnets 69 preferably generated approximately 3,000 gauss across the coiled conductor 66.

There are preferably two electromagnet assemblies utilized on opposite sides of the main beam so their forces and weights are symmetrical. However, there could be only one electromagnet assembly with a counterbalancing weight on the other side of the main beam or there could be three or more electromagnet assemblies symmetrically positioned around the main beam. Since the same electrical conductor is wound around each of the two bobbins, the current through the conductor to produce a desired electromagnetic force need only be half that required if only one electromagnet assembly is employed. The electrical conductor 66 is wound around each of the two bobbins 67 an equal number of turns and is wound around each of the two bobbins 67 in an opposite direction whereby the two electromagnet assemblies produce equal and opposite forces, resulting in an unidirectional torque applied to the helical shaped porition 42 of the bourdon tube about its axis of rotation. The electrical conductor 66 is attached to the latticework 62 and the torsion means support rod 63 as it winds between the two bobbins 67. To conduct electricity to and from the bourdon tube assembly inside the pressure chamber, it is preferable to employ two fine, brass leaf springs 70 and 70a capable of conducting electricity. Each of the two brass leaf springs is connected at one end to the torsion means support rod 63 (and coupled to the electrical conductor 66) and connected at the other end (not shown) to the pressure capsule. The two brass leaf springs preferably are symmetrically mounted with respect to the bourdon tube. The brass leaf springs 70 and 70a are connected to electrical conductors 66a and 66b at the point that they are mounted on the pressure capsule (not shown) and the electrical conductors 66a and 66b are fed through a pressure-tight port in plate 38. FIG. 3 illustrates the electrical conductors 66a and 66b protruding from the pressure-tight port in plate 38.

The precision pressure gauge according to this invention utilizes an optical system for sensing the amount of rotation of the bourdon tube. Referring again to FIGS. 3 and 4, an optic port 75 is provided through plate 38. A window 76, such as made of quartz, sapphire or Pyrex, is mounted in the optic port 75 against a shoulder 77 and secured therein by a lock member 78. Window 76 seals pressure chamber 39 against any pressure change but allows the transmission of electromagnetic radiation. Mounted on an arm 79 bolted to plate 38 is an electromagnetic radiation source 17. Electromagnetic radiation source 17 generates a well-defined beam of electromagnetic radiation which is transmitted through window 76 to mirror 12. Mounted on an arm 81 bolted to plate 38 is an electromagnetic radiation detection means 18. The locations of the electromagnetic radiation source, the mirror, and the electromagnetic radiation detection means 18 are chosen such that when the bourdon tube 11 is at a selected position, the beam of electromagnetic radiation is reflected from the mirror to a selected point on the electromagnetic radiation detection means 18. The electromagnetic radiation source may be any of numerous, commercially available devices well known to those skilled in the art, such as a light-emitting diode or a device emitting infared light. The spectrum of the electromagnetic radiation emitted by the source 17 may vary. The mirror 12 preferably is coated with a selected material, such as platinum, which is compatible with the gases being used in the pressure gauge and which will reflect the electromagnetic radiation beam. The electromagnetic radiation detection means 18 preferably comprises two solar cells mounted side-by-side. The beam of electromagnetic radiation reflected from the mirror 12 preferably is circular. Each solar cell generates an electrical signal proportional to the quantity of the electromagnetic radiation incident thereon. A preferred electromagnetic radiation detection means comprising two solar cells is that manufactured by Solar Systems having catalog number 5119A009.

A cover 84 is connected by bolt 85 to plate 38 to enclose the electromagnetic radiation source and electromagnetic radiation detection means.

Figure 8:
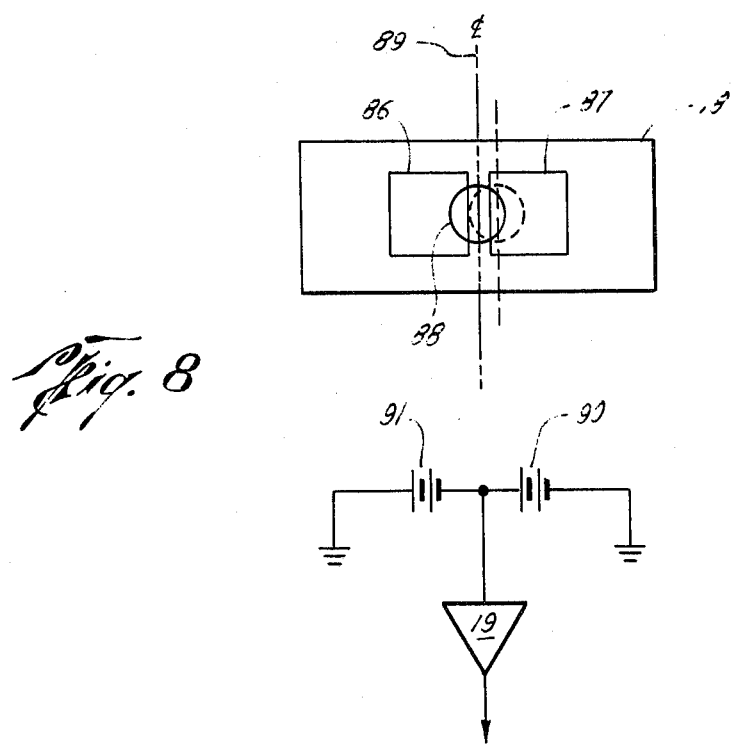
FIG. 8 is a diagrammatic view of a preferred electromagnetic radiation detection means comprising two solar cells, and a schematic diagram of the equivalent electrical circuit for such solar cells.

FIG. 8 illustrates diagrammatically a preferred electromagnetic radiation detection means 18 with solar cells 86 and 87 therein adjacent each other. The beam of electromagnetic radiation 88 is shown striking on the center line 89 between the two solar cells 86 and 87. The equivalent electrical circuit of the two solar cells is shown as two DC voltage sources 90 and 91, respectively. The outputs of the two voltage sources are combined and supplied to an amplifier 19. The voltage generated by each solar cell is proportional to the quantity of electromagnetic radiation incident thereon. When the quantity of electromagnetic radiation incident on each of the two solar cells is equal, they each generate an equal magnitude of voltage. But, since the two generated voltages are of opposite polarity, they cancel and no voltage is supplied to the amplifier 19. If the electromagnetic radiation beam moves to the position illustrated in FIG. 8 by dashed lines, solar cell 86 will generate less voltage and solar cell 87 will generate more voltage. Thus, a positive voltage will be applied to the input of amplifier 19.

In a precision pressure gauge according to this invention employing force-balancing electromagnetic assemblies connected for rotation with the bourdon tube and employing an optical system which generates an electrical signal responsive to the rotation of the bourdon tube, it is desirable to limit the magnitude of the rotation of the bourdon tube so that an accurate determination of the pressure differential across the walls of the bourdon tube can be made without moving either the electromagnetic radiation source or the electromagnetic radiation detection means. It is desirable to maintain the movement range of the electromagnetic radiation beam within the confines of the electromagnetic radiation detection means. In the operation of the pressure gauge according to this invention, in order to substantially eliminate movement of the bourdon tube 11, the gain of amplifier 19 is great whereby a very slight movement of the electromagnetic radiation beam across the electromagnetic radiation detection means, generates an electrical signal which, when amplified and supplied to the first and second force-balancing electromagnets, is sufficient to prevent any further rotation of the bourdon tube 11. Therefore, even though the electromagnetic radiation detection means chosen for the pressure gauge may utilize solar cells which easily generate voltage in excess of plus or minus 250 millivolts, the output of each of the solar cells rarely exceeds one-half millivolt. The DC gain of amplifier 19 preferably is chosen such that with the output of the solar cells varying between plus or minus ½ millivolt, the amplifier output varies between plus or minus 12 volts and plus or minus 20 milliamps.

For example, assume that the precision pressure gauge is constructed to measure pressures in the range of zero to one hundred pounds per square inch. Assume that the pressure within the pressure chamber 39 is "absolute," that is, zero psi. As the pressure within the bourdon tube increases, the bourdon tube will tend to rotate and the mirror will tend to reflect the electromagnetic radiation beam a selected direction, such as toward solar cell 87 as illustrated in FIG. 8. In the preferred embodiment of the pressure gauge, by the time the electromagnetic radiation beam has moved a very slight distance, such as approximately 15 microinches, the amplified DC voltage supplied to the first and second force-balancing electromagnet assemblies 13 and 14 causes magnetic forces to be generated great enough to prevent any further rotation of the bourdon tube. As the pressure in the bourdon tube increases to the selected level of 100 psi, the electromagnetic radiation beam preferably will have moved approximately 30 micro-inches and the amplified voltage will have increased sufficiently to generate magnetic forces great enough to prevent any further rotation of the bourdon tube.

Figure 9:
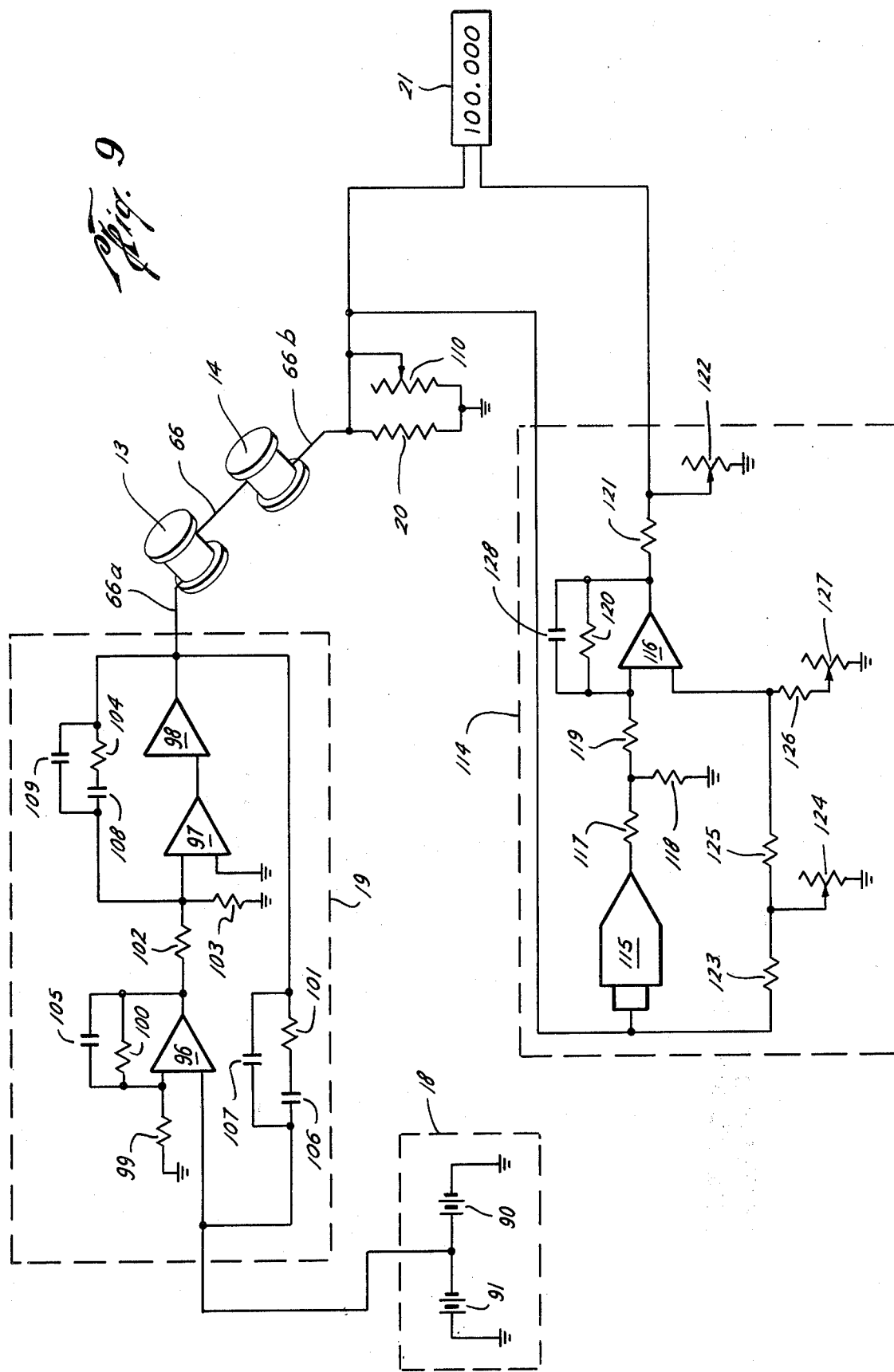
FIG. 9 is a schematic diagram of the preferred electrical circuitry of the pressure gauge illustrated in FIG. 1 according to this invention.

FIG. 9 illustrates schematically the preferred electrical circuitry to be utilized in the precision pressure gauge according to this invention. The amplifier 19 preferably comprises differential amplifiers, resistances, and capicitances well known to those skilled in the art. Preferred components of amplifier 19 are as follows:

Amplifier 96 = Analog Devices No. AD512KH
Amplifier 97 = Analog Devices No. AD512KH
Amplifier 98 = Burr-Brown No. 3329/03
Resistance 99 = 1 K ohm, ¼ watt, carbon
Resistance 100 = 510 K ohm, ¼ watt, carbon
Resistance 101 = 100 K ohm, ¼ watt, carbon
Resistance 102 = 47 K ohm, ¼ watt, carbon
Resistance 103 = 2.7 K ohm, ¼ watt, carbon
Resistance 104 = 1 K ohm, ¼ watt, carbon
Capacitance 105 = 0.001 microfarad ceramic disc
Capacitance 106 = 7.5 microfarad, 20 VDC Sprague, Tantalex
Capacitance 107 = 0.001 microfarad ceramic disc
Capacitance 108 = 1.0 microfarad, 20 VDC Sprague, Tantalex
Capacitance 109 = 0.001 microfarad ceramic disc The output of amplifier 19 is coupled over line 66a as previously explained to the first and second electromagnets or torsion means 13 and 14. The electrical signal output from the torsion means is then coupled over line 66b to precision resistor 20, such as a resistance manufactured by Texas Instruments as catalog number MC55C. A potentiometer 110 is preferably associated with precision resistance 20 for varying its effective resistance. In a typical operation of the portions of the system described to this point, if the pressure differential across the walls of the bourdon tube is zero psi, the voltage generated by the electromagnetic radiation detection means 18 is zero. Thus no voltage is amplified by amplifier 19. No voltage is applied to torsion means 13 and 14. And no voltage is supplied to precision resistance 20. If the pressure differential across the walls of the bourdon tube is one hundred psi, the voltage generated by the electromagnetic radiation detection means 18 is plus ½ millivolt. The amplified voltage supplied to torsion means 13 and 14 over line 66a is 10.050 volts. The voltage dropped across torsion means 13 and 14 is 50 millivolts. Thus the voltage supplied over line 66b to precision resistance 20 is 10.000 volts.

Figure 10:
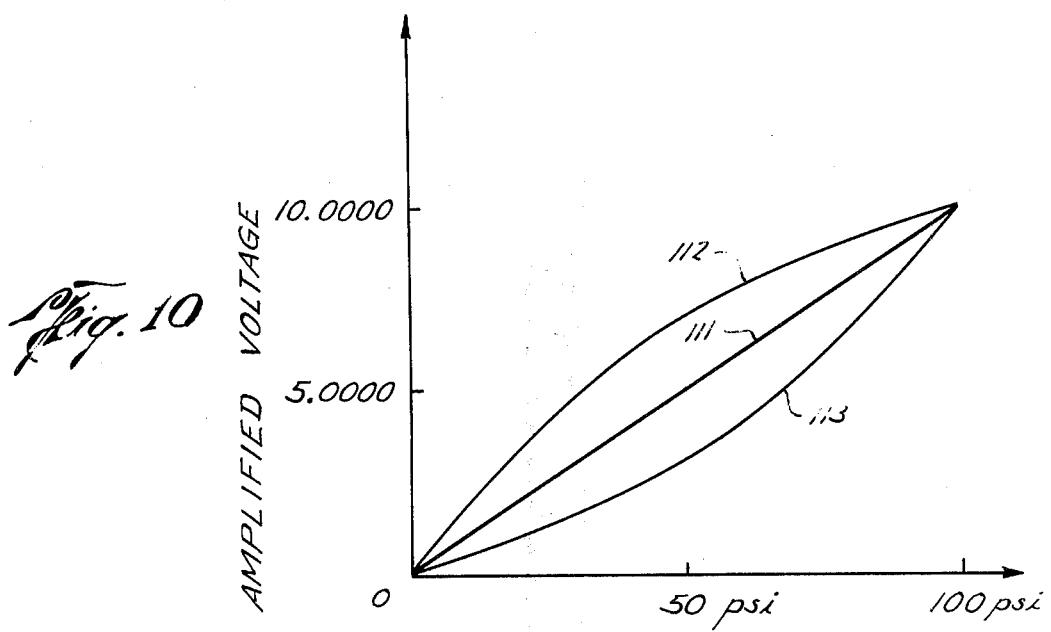
FIG. 10 is a graph of pressure per square inch differential across the walls of a typical fused-quartz, helical, bourdon tube compared with the amplified voltage supplied to the precision resistance, according to this invention

As illustrated in FIG. 10, if the amplified voltage supplied over line 66b to precision resistance 20 is zero volts when the pressure differential across the walls of the bourdon tube is zero psi and 10.000 volts when the pressure differential across the walls of the bourdon tube is 100 psi, it would be hoped that the amplified voltage applied to precision resistance 20 at all pressure differentials therebetween would be linear, as illustrated by line 111. But it has been found that a fused quartz, helical, bourdon tube operated with the pressure inside of the bourdon tube greater than the pressure outside of the bourdon tube typically produces a psi/amplified voltage graph similar to line 112. And a fused quartz, helical, bourdon tube operated with the pressure outside of the bourdon tube greater than the pressure inside the bourdon tube typically produces a psi/amplified voltage graph similar to line 113. It has been found that each of lines 112 and 113 differs from the linear line 111 by an amount which can be expressed in the following equation:

$$y = (ax^2 + bx) k$$

wherein $y$ equals plus or minus voltage proportional to the difference in pressure between the non-linear line and the linear line, wherein $x$ equals the magnitude of the amplified voltage, $a$ and $b$ are constants and have a plus or minus sign depending on the mode of operation of the bourdon tube, and $k$ is an adjustable constant.

Thus, it is preferable to include a linearizing means 114 in the electrical circuitry to convert a non-linear signal into a linear signal. As illustrated in FIG. 9, linearizing means 114 preferably comprises an amplifier 115 which functions to square the magnitude of the amplified voltage (less the voltage dropped across the torsion means) generated by amplifier 19 and multiply it times a selected constant. This constant is generated by resistor 117 and resistor 118. The first term of the second order equation $y=(ax^2+bx)k$ is thereby generated. The second term of the equation $y=(ax^2+bx)k$ is generated by multiplying the amplified voltage generated by amplifier 19 (less the voltage dropped across the torsion means) times a selected constant. This constant is generated by resistor 123 and potentiometer 124. The two generated terms of the second order equation are algebraically summed through amplifier 116 and then multiplied by an adjustable constant. This adjustable constant is generated by resistor 121 and potentiometer 122. Preferred values for the various components comprising linearizing means 114 are as follows:

Amplifier 115 = Analog Devices No. AD530J
Amplifier 116 = Analog Devices No. AD512KH
Resistance 117 = 100 K ohms, RN55C, metal film
Resistance 118 = 0.5 K ohms, RN55C, metal film
Resistance 119 = 100 K ohms, RN55C, metal film
Resistance 120 = 100 K ohms, RN55C, metal film
Resistance 121 = 2 K ohms, RN55C, metal film
Resistance 122 = 10 K ohms, Bourns No. 3059P
Resistance 123 = 100 K ohms, RN55C, metal film
Resistance 124 = to 1 K ohms, Bourns No. 3059P
Resistance 125 = 100 K ohms, RN55C, metal film
Resistance 126 = 51 K ohms, RN55C, metal film
Resistance 127 = 100 K ohms, Bourn No. 3059P
Capacitance 128 = 0.001 microfarad ceramic disc The voltage dropped across the precision resistance 20 is coupled to the high input of the digital readout apparatus 21. The output of the linearizing means 114 is coupled to the low input of the digital readout apparatus 21. The digital readout apparatus sums algebraically the voltage generated by amplifier 19 after it has experienced a voltage drop due to the electromagnet assemblies 13 and 14 and the voltage generated by the linearizing means 114. The result of this summation is a display on the digital readout apparatus 21 which is linear with pressure. The digital readout apparatus is a standard device well known to those skilled in the art such as a Fluke Digital Voltmeter, Model No. 8300A. The readout apparatus could also be an analog device.

Thus, the precision pressure gauge according to this invention, provides a helical shaped, fused quartz, bourdon tube which transduces pressure differentials into rotary motion. Such rotary motion is sensed with a fixed electromagnetic radiation system. The precision pressure gauge employs a force-balancing system directly connected to the bourdon tube for preventing appreciable rotation of the bourdon tube under ordinary circumstances, thereby limiting the magnitude of the lateral movement of the reflected electromagnetic radiation beam to the confines of the electromagnetic radiation detection means. Sometimes the bourdon tube will experience unusual rotation, such as by a sudden change in pressure differential across the walls of the bourdon tube. The magnitude of such rotation is limited by physical stops (not shown) attendant to the main beam 51 whereby the electromagnetic radiation beam does not move off of the electromagnetic radiation detection means. In such acase, the electrical signal generated by the electromagnetic radiation source and amplified and supplied across the electromagnetic assemblies functions to return the bourdon tube substantially to its proper null position for the pressure differential being experienced.

The construction of a precision pressure gauge according to this invention as illustrated in FIG. 2 is as heretofore described except that the output of amplifier 19 is coupled to a servo valve 26. Such servo valve may be any of the commercially available products well known to those skilled in the art. A power supply 29 and potentiometer 30, such as are well known to those skilled in the art, are utilized. Amplifier 31 may be identical to amplifier 19 or, since it is not included within a closed-loop system as is amplifier 19, may simply be any one of numerous differential amplifiers well known to those skilled in the art. A linearizing means 114 such as has been previously described (not shown in FIG. 2) is employed to linearize the amplified voltage signal generated by amplifier 31 before it is supplied to the digital readout apparatus 21.

It will now be apparent to those skilled in the art that the force-balanced, precision pressure gauge according to this invention provides an intrument which is a substantial improvement over prior pressure gauges. Since it has substantially no moving parts, it reduces friction losses and maintenance requirements. The operation of the instrument is simpler than previous instruments. Although some rotary deformation of a helical bourdon tube is required—in order that some electrical signal, albeit small, be generated by the solar cells and applied to the electromagnet assemblies—the improved force-balance system according to this invention limits such rotary motion whereby it is not appreciable. By limiting the rotation of the helical bourdon tube whereby the movement of the electromagnetic radiation beam is in the magnitude of 30 microinches, it has been found that the sensitivity, resolution and accuracy of the instrument is at least one part in 100,000 parts. It has been found that the instrument operates rapidly and reliably.

Thus, this invention provides an improved precision pressure gauge employing a fused quartz, helical, bourdon tube utilized to transduce pressure into rotary motion, employing a fixed optical system to sense the rotary motion of the bourdon tube, and employing a force balancing system connected directly to the bourdon tube. Many variations in the form of the preferred embodiment will now be apparent to those skilled in the art. Additionally, many structural changes may be made in the various components of the system without departing from the invention. Therefore, the invention should not be limited to the preferred embodiment, but rather should extend to the full scope and spirit of the invention defined in the appended claims.

What is claimed is:

1. A precision pressure gauge comprising:
   a pressure capsule providing a pressure chamber;
   a fused quartz, helical, bourdon tube mounted in the pressure chamber, having one end fixed to the pressure capsule, and having a free end for transducing a pressure differential across the walls of the bourdon tube into rotary motion;
   a reflective means secured to the bourdon tube for rotation therewith;
   an electromagnetic radiation source fixed with respect to the pressure capsule for directing a well-defined electromagnetic radiation beam onto the reflective means;
   an electromagnetic radiation means fixed with respect to the pressure capsule for sensing the electromagnetic radiation beam directed by the electromagnetic radiation source onto the reflective means and reflected from the reflective means and for generating an electrical signal proportional to the quantity of the electromagnetic radiation incident thereon; and
   two electromagnets directly connected to the bourdon tube on opposite sides thereof for rotation therewith, the two electromagnets producing equal but opposite forces providing torque to the bourdon tube for rotating about its axis of rotation.

2. A precision pressure gauge comprising:
   a pressure capsule providing a pressure chamber;
   a fused quartz, helical, bourdon tube mounted in the pressure chamber, having one end fixed to the pressure capsule, and having a free end for transducing a pressure differential across the walls of the bourdon tube into rotary motion;
   a reflective means secured to the bourdon tube for rotation therewith;
   an electromagnetic radiation source fixed with respect to the pressure capsule for directing a well-defined electromagnetic radiation beam onto the reflective means;
   an electromagnetic radiation detection means fixed with respect to the pressure capsule for sensing the electromagnetic radiation beam directed by the electromagnetic radiation source onto the reflective means and reflected from the reflective means and for generating an electrical signal proportional to the quantity of the electromagnetic radiation incident thereon; and
   amplifier means coupled to the output of the electromagnetic radiation detection means for amplifying the electrical signal;
   at least one electromagnet assembly associated with the bourdon tube, a portion of such electromagnet assembly being connected directly to the bourdon tube for rotation therewith;
   electrical conductor means connected between the amplifier means and the electromagnet assembly for supplying the amplified electrical signal to the electromagnet assembly whereby the electromagnet assembly applies torque to the bourdon tube in a magnitude proportional to the electrical signal and sufficient to prevent the bourdon tube from rotating appreciably from its initial null position to a new null position representative of the pressure differential being experienced by the bourdon tube;
   a precision resistance;
   a linearizing circuit;
   electrical conductor means connected between the electromagnet assembly and the precision resistance and between the precision resistance and the linearizing circuitry for conducting the amplified electrical signal, after it has been supplied to the electromagnet assembly, through the precision resistance and to the linearizing circuitry;
   a readout apparatus; and
   electrical conductor means connected between the electromagnet assembly and the readout apparatus and between the linearizing circuit and the readout apparatus.

3. A precision pressure gauge according to claim 2 wherein the linearizing means comprises discrete electronics designed to solve the following equation:

$$y = (ax^2 + bx)k$$

wherein $y$ is an electrical signal proportional to the non-linearity of the amplified electrical signal produced by the electromagnetic radiation detection means as a result of the pressure differential across the walls of the bourdon tube, $x$ is the magnitude of the electrical signal supplied to the linearizing means, a and b are constants, and k is an empirically determined constant.

4. A precision pressure gauge comprising:
a pressure capsule providing a pressure chamber;
a fused quartz, helical, bourdon tube mounted in the pressure chamber, having one end fixed to the pressure capsule and having a free end for transducing a pressure differential across the walls of the bourdon tube into rotary motion;
means through the pressure capsule for supplying pressure to the inside of the walls of the bourdon tube;
means through the pressure capsule for supplying pressure to the outside of the walls of the bourdon tube;
a reflective means secured to the bourdon tube for rotation therewith;
means in the pressure capsule for allowing the transfer of electromagnetic radiation;
an electromagnetic radiation source fixed with respect to the pressure capsule for directing a well-defined beam of electromagnetic radiation through the electromagnetic radiation transferring means in the pressure capsule and onto the reflective means;
a pair of solar cells fixed with respect to the pressure capsule for sensing the beam of electromagnetic radiation generated by the electromagnetic radiation source onto the reflective means and reflected from the reflective means back through the electromagnetic radiation transferring means in the pressure capsule, each of the solar cells generating an electrical signal of selected polarity proportional to the quantity of reflected electromagnetic radiation incident thereon;
an amplifier coupled to the output of the two solar cells for amplifying the cumulative electrical signal generated by the two solar cells;
first and second electromagnet assemblies connected to the bourdon tube on opposite sides thereof for rotation therewith;
electrical conductor means electrically connecting the amplifier to the two electromagnet assemblies, whereby the amplified electrical signal is supplied to the electromagnet assemblies,
the two electromagnet assemblies thereby producing equal but opposite forces providing torque to the bourdon tube for rotating it about its axis of rotation in the direction opposite to that produced by a pressure differential across the walls of the bourdon tube,
the magnitude of the amplified electrical signal being such that the torque supplied to the bourdon tube by the two electromagnet assemblies is sufficient under ordinary circumstances to prevent appreciable rotary movement of the bourdon tube and, if the bourdon tube should experience unusual rotation, to return the bourdon tube to its proper null position for the pressure differential being experienced;
a linearizing means for adjusting the magnitude of the electrical signal supplied thereto to compensate for any non-linearity therein;
electrical conductor means connecting the two electromagnet assemblies to the linearizing means whereby the amplified electrical signal is supplied to the linearizing means after such signal has been supplied across the two electromagnet assemblies;
a readout means for displaying the pressure differential being measured across the wall of the bourdon tube; and
electrical conductor means connecting the linearizing means to the readout means.

5. A precision pressure gauge according to claim 1 wherein the linearizing means comprises discrete electronics designed to solve the following equation;

$$y = (ax^2 + bx)k$$

wherein $y$ is an electrical signal proportional to the non-linearity of the amplified electrical signal produced by the pair of solar cells as a result of the pressure differential across the walls of the bourdon tube, $x$ is the magnitude of the electrical signal supplied to the linearizing means, $a$ and $b$ are constants, and $k$ is an empirically determined constant.

6. A precision pressure gauge according to claim 4 wherein the readout means comprises:
a precision resistor; and
a readout apparatus which displays data responsive to the voltage drop across the precision resistance and the output of the linearizing means.

7. A precision pressure gauge according to claim 6 wherein the readout means is a digital readout means having a high input and a low input and including:
electrical conductor means connecting the electromagnetic assemblies with the precision resistance and connecting the electromagnet assemblies with the high input of the digital readout means; and
electrical conductor means connecting the linearizing means with the low input of the digital readout means;
wherein the digital readout means algebraically sums the two signals supplied to it, thereby providing a linear and direct display of the pressure being measured.

8. A precision pressure gauge comprising:
a pressure capsule providing a pressure chamber;
a bourdon tube mounted in the pressure chamber, one end of the bourdon tube being movable in response to a pressure differential experienced across the walls of the bourdon tube;
means associated with the bourdon tube for sensing such movement of the end of the bourdon tube and for generating an electrical signal representative thereof;
means for receiving the electrical signal generated by the sensing means and amplifying such signal by a selected magnitude;
means associated with the bourdon tube for supplying to the bourdon tube a precisely controlled force responsive to an electrical signal supplied to such force means;
means for supplying the amplified electrical signal to the force means associated with the bourdon tube;
the force means associated with the bourdon tube applying a force to the bourdon tube responsive to the amplified electrical signal such that the end of the bourdon tube is allowed to move a very small almost infinitesimal amount from its initial null position to a new null position;
a linearizing means for adjusting the magnitude of the amplified electrical signal to compensate for any nonlinearity in such electrical signal; and
a readout means for receiving the linearized electrical signal and for displaying the pressure differential being experienced across the wall of the bourdon tube.

9. A precision pressure gauge comprising:

a pressure capsule providing a pressure chamber;

a bourdon tube mounted in the pressure chamber, one end of the bourdon tube being movable in response to a pressure differential experienced across the walls of the bourdon tube;

a reflective means secured to the bourdon tube for rotation therewith;

an electromagnetic radiation source fixed with respect to the pressure capsule for directing a well-defined electromagnetic radiation beam into the reflective means;

two solar cells mounted adjacent to each other on either side of the initial null position of the electromagnetic radiation beam reflected from the reflective means, each solar cell generating an electrical signal of selected polarity proportional to the quantity of the electromagnetic radiation incident thereon;

means associated with the bourdon tube for supplying to the bourdon tube a precisely controlled force responsive to an electrical signal supply to such force means;

means for supplying the electrical signal generated by the one of the solar cells on which the reflected electromagnetic radiation beam is directed, to the force means associated with the bourdon tube; and the force means associated with the bourdon tube applying a force to the bourdon tube responsive to the electrical signal such that the end of the bourdon tube is allowed to move only a very small almost infinitesimal amount from its initial null position to a new null position, such movement by the bourdon tube being limited within a single displacement increment whereby the electromagnetic radiation beam does not extend beyond the solar cell mounted on either side of the initial null position.

* * * * *